US011512597B2

(12) United States Patent
Propheter-Hinckley et al.

(10) Patent No.: US 11,512,597 B2
(45) Date of Patent: Nov. 29, 2022

(54) AIRFOIL WITH CAVITY LOBE ADJACENT COOLING PASSAGE NETWORK

(71) Applicant: United Technologies Corporation, Farmington, CT (US)

(72) Inventors: Tracy A. Propheter-Hinckley, Rocky Hill, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 147 days.

(21) Appl. No.: 16/594,379

(22) Filed: Oct. 7, 2019

(65) Prior Publication Data
US 2020/0332663 A1 Oct. 22, 2020

Related U.S. Application Data

(60) Provisional application No. 62/757,931, filed on Nov. 9, 2018.

(51) Int. Cl.
*F01D 5/18* (2006.01)
*F01D 25/12* (2006.01)
*F02C 7/18* (2006.01)

(52) U.S. Cl.
CPC ............. *F01D 5/186* (2013.01); *F01D 5/187* (2013.01); *F01D 25/12* (2013.01); *F02C 7/18* (2013.01);
(Continued)

(58) Field of Classification Search
CPC ......... F05D 2260/202; F05D 2260/204; F05D 2240/306; F05D 2240/124;
(Continued)

(56) References Cited

U.S. PATENT DOCUMENTS 5,743,708 A    4/1998 Cunha et al.
6,506,013 B1   1/2003 Burdgick et al.
(Continued)

FOREIGN PATENT DOCUMENTS

EP    1916388    4/2008
EP    3156594    4/2017

OTHER PUBLICATIONS

European Search Report for European Patent Application No. 19208073.7 completed Mar. 19, 2020.

*Primary Examiner* — Courtney D Heinle
*Assistant Examiner* — Danielle M. Christensen
(74) *Attorney, Agent, or Firm* — Carlson, Gaskey & Olds, P.C.

(57) ABSTRACT

An airfoil includes an airfoil section that has an airfoil wall that defines a leading end, a trailing end, and first and second sides that join the leading end and the trailing end. The first and second sides span in a longitudinal direction between first and second ends, and the airfoil wall circumscribes an internal core cavity. An arced rib extends from the first side to the second side and divides the internal core cavity into a forward cavity and an aft cavity. A cooling passage network is embedded in the airfoil wall aft of the rib and between inner and outer portions of the airfoil wall. The network includes a cooling passage leading edge and a cooling passage trailing edge. The aft core cavity has a central cavity section and a cavity lobe. The cavity lobe projects between the rib and the cooling passage leading edge.

18 Claims, 4 Drawing Sheets

(52) U.S. Cl.
CPC .... *F05D 2220/32* (2013.01); *F05D 2260/202* (2013.01); *F05D 2260/204* (2013.01); *F05D 2300/608* (2013.01)

(58) Field of Classification Search
CPC ...... F05D 2300/608; F01D 5/18; F01D 5/186; F01D 5/187; F01D 25/12; F02C 7/18
See application file for complete search history.

(56) References Cited

U.S. PATENT DOCUMENTS

| | | | |
|---|---|---|---|
| 7,056,083 | B2 | 6/2006 | Gray |
| 10,767,490 | B2 * | 9/2020 | Clum ...................... F01D 5/186 |
| 2008/0118366 | A1 * | 5/2008 | Correia ................... F01D 5/187 |
| | | | 416/97 R |
| 2014/0033736 | A1 | 2/2014 | Propheter-Hinckley |
| 2017/0037733 | A1 * | 2/2017 | Dujol ...................... F01D 5/187 |
| 2017/0167269 | A1 * | 6/2017 | Itzel ........................ F01D 9/065 |
| 2017/0328218 | A1 * | 11/2017 | Leary ...................... F01D 9/041 |
| 2019/0040747 | A1 * | 2/2019 | Izumi ....................... F01D 5/20 |
| 2019/0218940 | A1 * | 7/2019 | Propheter-Hinckley .................... F01D 5/186 |
| 2020/0277860 | A1 * | 9/2020 | Gross ...................... F01D 5/188 |

* cited by examiner

AIRFOIL WITH CAVITY LOBE ADJACENT COOLING PASSAGE NETWORK

CROSS-REFERENCE TO RELATED APPLICATION

This application claims priority to U.S. Provisional Application No. 62/757,931 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a leading end, a trailing end, and first and second sides that join the leading end and the trailing end. The first and second sides span in a longitudinal direction between first and second ends. The airfoil wall circumscribes an internal core cavity, an arced rib in the internal core cavity. The arced rib extends from the first side to the second side and dividing the internal core cavity into a forward core cavity and an aft core cavity, and a cooling passage network is embedded in the airfoil wall aft of the arced rib and between inner and outer portions of the airfoil wall. The cooling passage network includes a cooling passage leading edge and a cooling passage trailing edge. The aft core cavity has a central cavity section and a cavity lobe extending from the central cavity section and projecting between the arced rib and the cooling passage leading edge.

In a further embodiment of any of the foregoing embodiments, the cavity lobe tapers along the cooling passage leading edge.

In a further embodiment of any of the foregoing embodiments, the cavity lobe opens exclusively to the central cavity section.

In a further embodiment of any of the foregoing embodiments, the cavity lobe has an arced cavity leading edge.

In a further embodiment of any of the foregoing embodiments, the cavity lobe has a straight cavity trailing edge.

In a further embodiment of any of the foregoing embodiments, the airfoil includes a platform attached to the airfoil section. The platform includes an opening that opens into the central cavity section, and the opening includes a notch that opens to the cavity lobe.

In a further embodiment of any of the foregoing embodiments, the airfoil includes a platform attached to the airfoil section, and the platform includes an opening that opens exclusively into the central cavity section.

In a further embodiment of any of the foregoing embodiments, in the airfoil section, the cooling passage network and the aft core cavity are fluidly isolated from each other.

In a further embodiment of any of the foregoing embodiments, the cooling passage network includes a plurality of segmented longitudinally-elongated ribs.

In a further embodiment of any of the foregoing embodiments, the segmented longitudinally-elongated ribs are parallel.

In a further embodiment of any of the foregoing embodiments, the cooling passage leading edge and the cooling passage trailing edge are parallel.

In a further embodiment of any of the foregoing embodiments, the cooling passage network includes a plurality of segmented longitudinally-elongated ribs, and the segmented longitudinally-elongated ribs are parallel.

In a further embodiment of any of the foregoing embodiments, the cavity lobe has an arced cavity leading edge and a straight cavity trailing edge.

In a further embodiment of any of the foregoing embodiments, in the airfoil section, the cooling passage network and the aft core cavity are fluidly isolated from each other.

A gas turbine engine according to an example of the present disclosure includes a compressor section, a combustor in fluid communication with the compressor section, and a turbine section in fluid communication with the combustor. The turbine section has a turbine airfoil according to any of the foregoing embodiments.

In a further embodiment of any of the foregoing embodiments, the cavity lobe has an arced cavity leading edge.

In a further embodiment of any of the foregoing embodiments, the cavity lobe has a straight cavity trailing edge.

In a further embodiment of any of the foregoing embodiments, the airfoil includes a platform attached to the airfoil section. The platform includes an opening that opens into the central cavity section, and the opening includes a notch that opens to the cavity lobe.

In a further embodiment of any of the foregoing embodiments, the airfoil includes a platform attached to the airfoil section, and the platform includes an opening that opens exclusively into the central cavity section.

In a further embodiment of any of the foregoing embodiments, in the airfoil section, the cooling passage network and the aft core cavity are fluidly isolated from each other.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
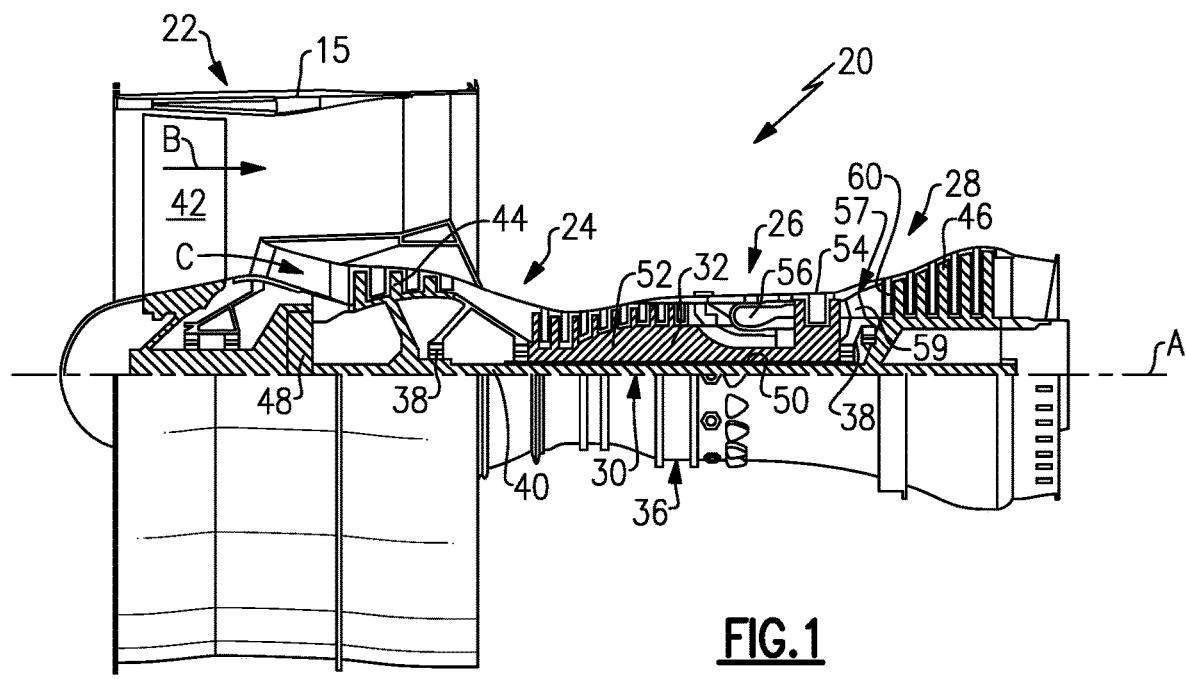
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
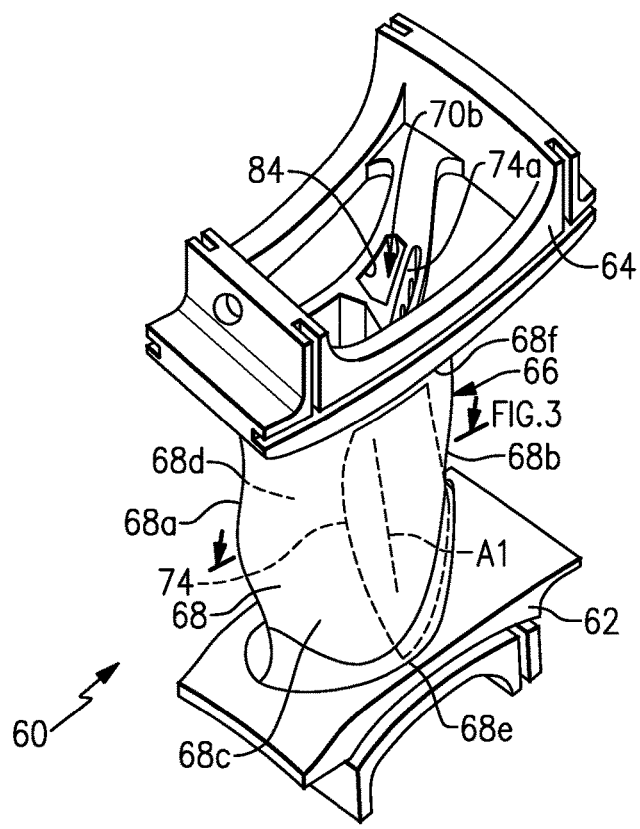
FIG. 2 illustrates an airfoil of the gas turbine engine of FIG. 1.
Figure 3:
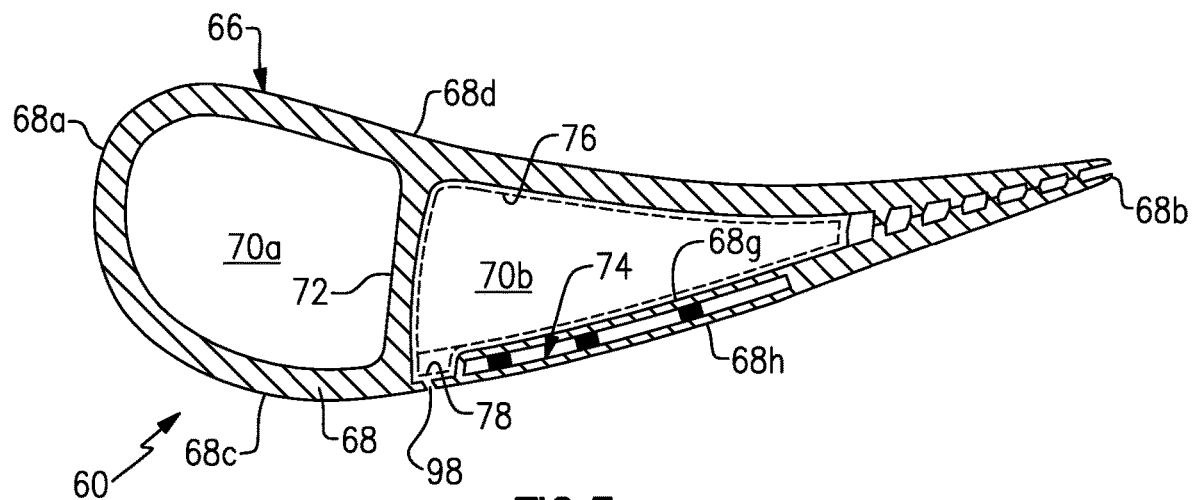
FIG. 3 illustrates a sectioned view of the airfoil of FIG. 2.
Figure 4:
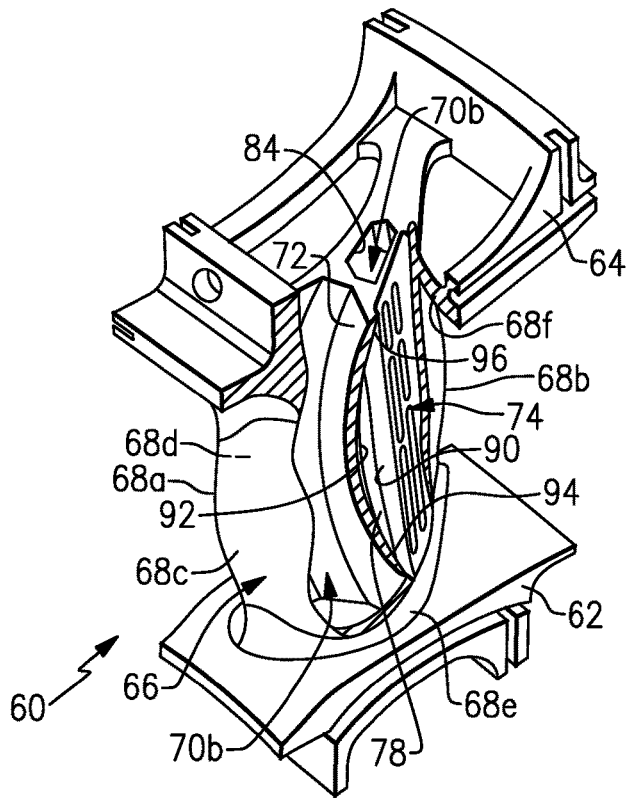
FIG. 4 illustrates a partial cutaway view of the airfoil of FIG. 2.

FIG. 2 illustrates a representative example of a turbine airfoil 60 used in the turbine engine 20 (see also FIG. 1), FIG. 3 shows a sectioned view taken through the mid-span of the airfoil 60, and FIG. 4 shows a partial cutaway view of the airfoil 60. As shown, the turbine airfoil 60 is a turbine vane; however, it is to be understood that, although the examples herein may be described with reference to the turbine vane, this disclosure may also be applicable to turbine blades.

The turbine airfoil 60 includes an inner or first platform 62, an outer or second platform 64, and an airfoil section 66 that radially spans between the inner and outer platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines an arced leading end 68a, a trailing end 68b, and first and second sides 68c/68d that join the leading and trailing ends 68a/68b. The first and second sides 68c/68d span in a longitudinal direction, denoted by axis A1 (which is also a radial direction relative to the engine central axis A), between first and second ends 68e/68f. The first and second ends 68e/68f are attached, respectively, to the first and second platforms 62/64. In this example, the first side 68c is a suction side and the second side 68d is a pressure side.

The arced leading end 68a is convex with respect to the axial middle of the airfoil section 66. That is, the convex leading end 68a bows outwards relative to the middle of the airfoil section 66. In the illustrated example, the trailing end 68b is straight but may alternatively be arced, such as convex.

The outer wall 68 of the airfoil section 66 circumscribes an internal core cavity 70. The airfoil section 66 further includes an arced rib 72 in the internal core cavity 70 that extends from the first side 68c to the second side 68d. The arced rib 72 arcs toward the arced leading end 68a. For example, the arced rib 72 substantially follows the curvature of the arced leading end 68a. In further examples, the arced rib 72 and is semi-circular and the arced leading end 68a is semi-circular. In one example, the arced rib 72 and the arced leading end 68a each have a radius of curvature, and the radii of curvatures are equal.

The arced rib 72 partitions the internal core cavity 70, diving the cavity 70 into a forward core cavity 70a and an aft core cavity 70b. In this example, the arced rib 72 is solid and free of any orifices. The arced rib 72 thereby fluidly isolates the forward and aft core cavities 70a/70b.

There is at least one cooling passage network 74 embedded in the airfoil outer wall 68 between inner and outer portions 68g/68h of the airfoil wall 68. For example, the cooling passage network 74 is embedded in the first side 68c of the outer wall 68, although one or more networks 74 could additionally or alternatively be embedded in the second side 68d. The cooling passage network 74 may also be referred to as a skincore or skincore passage. A "skincore" or "skincore passage" is a reference to the thin investment casting core or cores that is/are typically used to make such embedded passages, as opposed to a main core that is used to form a main or central core cavity in an airfoil.

The network 74 is fluidly isolated in the airfoil section 66 from the aft core cavity 70b. For instance, the network 74 has open longitudinal ends 74a (FIG. 2, one shown) that open in the platforms 62/64 by which cooling air is fed into the network 74 and is discharged from the network 74. For instance, the cooling air may be fed into the network 74 from one of the platforms 62/64 and then discharged from the network 74 into the other of the platforms 62/64. The network 74 and the aft core cavity 70b may be interconnected through one or both of the platforms 62/64, but in this example there are no passages in the airfoil section 66 that interconnect the network 74 and core cavity 70b.

The shape of the airfoil section 66 and, in particular the arced leading end 68a, are designed for aerodynamic performance. However, the arced leading end 68a and arced rib 72 challenge the use of a skincore or skincore passage for enhanced cooling. More specifically, a typical airfoil section for a turbine airfoil of a gas turbine engine has a straight leading end, a straight rib, and a skincore passage with a straight leading edge along the margin of the rib. Thus, the wall portion between the leading edge of the skincore passage and the margin of rib is of relatively constant in thickness along the entirety of the radial span of the skincore passage. However, for an arced rib, the wall portion between the straight leading edge of the skincore passage and the margin of arced rib has a D-shaped thickness along the radial span of the skincore passage. The middle part of the D-shaped wall portion is thicker than at the ends and thus can be challenging to properly cool.

Figure 5:
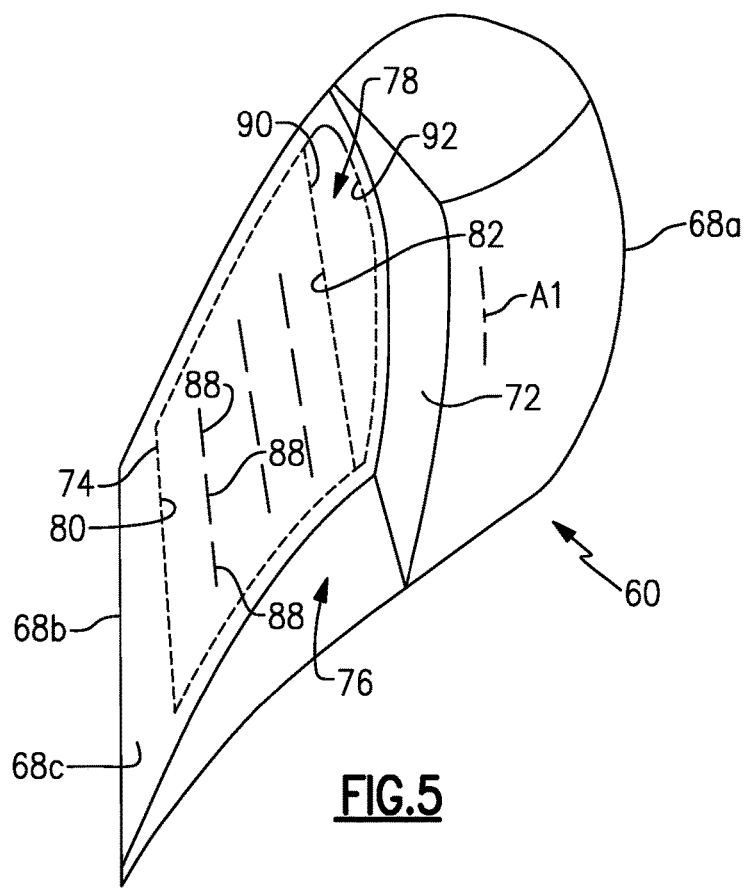
FIG. 5 is a schematic illustration of an airfoil showing a cavity lobe near a leading edge of a cooling passage network.

In this regard, as schematically depicted in FIG. 5 (see also FIG. 3), the aft core cavity 70b is configured to provide cooling to the margin of the rib 72 near the network 74, between the rib 72 and the network 74. For instance, the aft core cavity 70b includes a central cavity section 76 (outlined in dashed lines in FIG. 3) that is bound or defined by the rib 72 and sides 68d/68c. The aft core cavity 70b further includes a cavity lobe 78 (also outlined in dashed lines in FIG. 3) that extends from the central cavity section 76 into a location adjacent the margin of the rib 72 and the network 74 to provide cooling.

Figure 6:
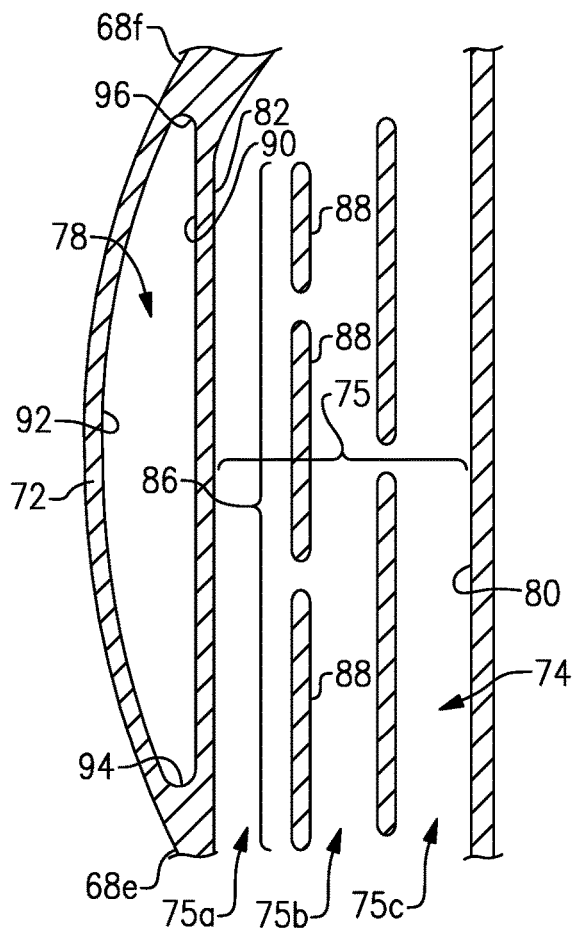
FIG. 6 illustrates a cavity lobe and a cooling passage network.

FIG. 6 illustrates a sectioned view of the network 74 and cavity lobe 78 taken longitudinally through the first wall 68c from the first end 68e to the second end 68f. The network 74 defines a thin cavity 75 that is bound axially by a trailing edge 80 and a leading edge 82 and laterally by the inner and outer wall portions 68g/68h (FIG. 3). In the illustrated example, both the trailing edge 80 and the leading edge 82 are straight and are parallel to each other. Alternatively, if the trailing end 68b of the airfoil section 66 is arced, the trailing edge 80 may be arced to follow the arc of the trailing end 68b.

The radially inner and outer ends of the cavity 75 may be open or include orifices or the like for conveying cooling air. For example, the cavity 75 opens into or is fluidly connected with cavities in the first and second platforms 62/64 that serve to deliver cooling air to, and receive cooling air from, the cavity 75.

The network 74 includes a plurality of segmented longitudinally-elongated ribs 86. In the example shown, each rib 86 is of made up of longitudinally-elongated segments 88. The segments 88 of each rib 86 are generally longitudinally aligned end-to-end, but are not in contact. Rather, there are gaps between the segments 88. In this example, each segment 88 has a uniform thickness over substantially its entire longitudinal length.

The ribs 86 partition the cavity 75 into longitudinally-elongated passages 75a/75b/75c. In this example, the passage 75a is the leading or forward-most passage, the passage 75c is the aft or aft-most passage, and the passage 75b is an intermediate passage that is axially between the passages 75a/75c. As will be appreciated, additional or fewer passages can be provided.

The cavity lobe 78 extends along the leading edge 82 of the network 74. The cavity lobe 78 is defined between a cavity trailing edge 90, a cavity leading edge 92, and inner and outer cavity edges 94/96. In this example, the cavity trailing edge 90 is straight and the cavity leading edge 92 is arced such that the cavity lobe 78 generally has a "D-shape." The arc of the cavity leading edge 92 may be congruent with the arc of the rib 72. The cavity lobe 78 thus tapers along the leading edge 82 of the network 74, from the mid-section of the "D" toward the inner and outer cavity edges 94/96.

The cavity lobe 78 in this example is fluidly connected exclusively with the central cavity section 76. The cavity lobe 78 is longitudinally-elongated but does not extend all the way to the first and second ends 68e/68f. Thus, the cavity lobe 78 opens only to the central cavity section 76. In this regard, an opening 84 in the platform 64 opens exclusively into the central cavity section 76.

During operation, cooling air, such as bleed air from the compressor section 24, is provided through the opening 84 and into the central cavity section 76. The cooling air flows from the central cavity section 76 into the cavity lobe 78 to thereby provide cooling to the region of the airfoil wall 68 between the leading edge 82 of the network 74 and the margin of the rib 72. Optionally, one or more cooling holes 98 (FIG. 3) can be provided that open through the wall 68 into the cavity lobe 78. A pressure differential between the aft core cavity 70b and the exterior of the airfoil section 66 can be used to ensure that cooling air flows from the central cavity section 76 through the cavity lobe 78 to the cooling holes 98. Additionally, to enhance cooling, the cooling holes 98 can be located forward of the choke point of the adjacent airfoil. Forward of the choke point the cooling air discharged from the cooling holes 98 will flow along the outer surface of the wall 68 to provide film cooling. The cooling holes 98 may alternatively or additionally be located aft of the choke point, but the discharged cooling air may separate from the outer surface and be lost into the core gaspath stream.

Figure 8:
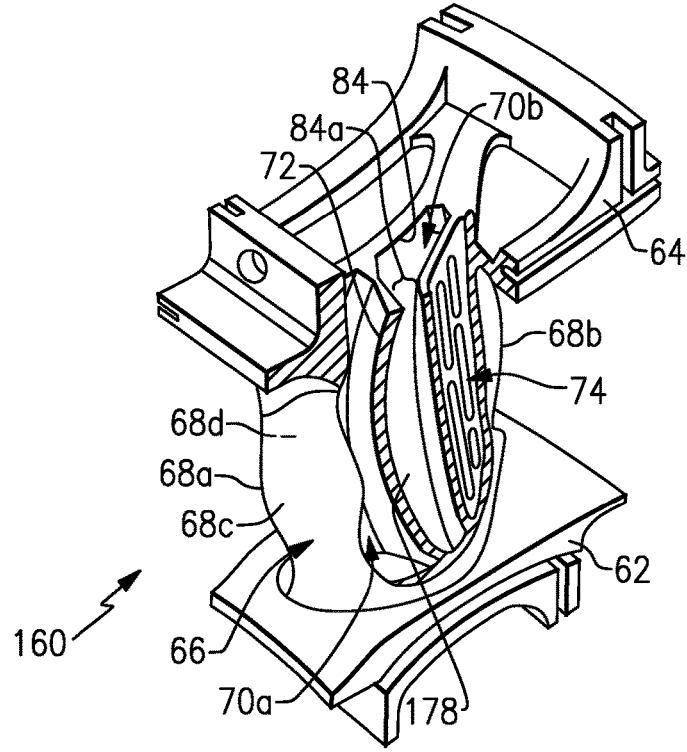
FIG. 8 illustrates a partial cutaway view of an airfoil and the cavity lobe of FIG. 7.
Figure 7:
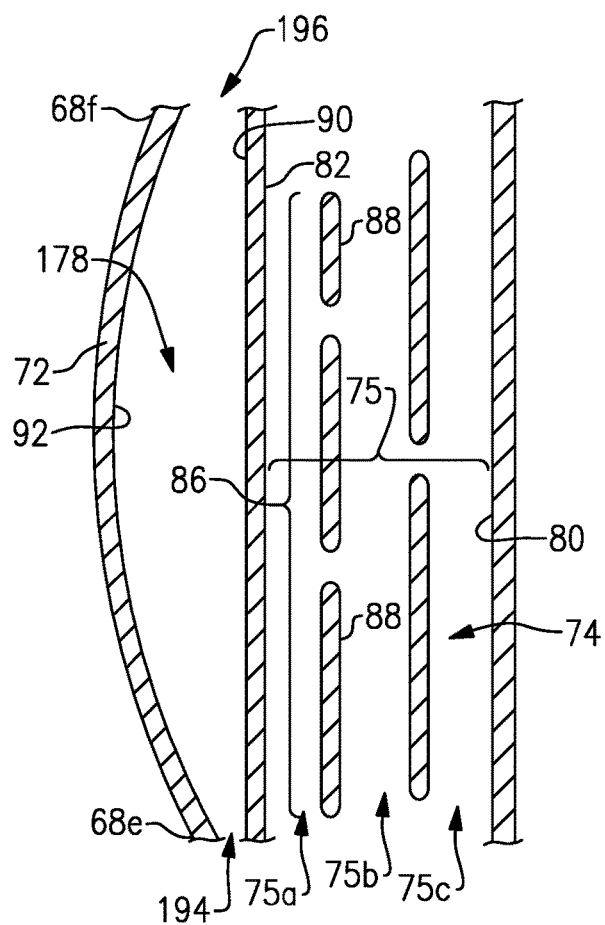
FIG. 7 illustrates another example of a cavity lobe.

FIG. 7 illustrates a sectioned view of the network 74 and another example of a cavity lobe 178 taken longitudinally through the first wall 68c from the first end 68e to the second end 68f, and FIG. 8 illustrates a partial cutaway view of an airfoil 160 and network 74. In this disclosure, like reference numerals designate like elements where appropriate and reference numerals with the addition of one-hundred or multiples thereof designate modified elements that are understood to incorporate the same features and benefits of the corresponding elements. In this example, rather than exclusively being fed from the central cavity section 76, the cavity lobe 178 has open longitudinal ends 194/196. For instance, the opening 84 in the second platform 64 includes a notch 84a that opens to the open end 196 of the cavity lobe 178. Thus, the cavity lobe 178 can be fed directly from the opening 84 rather than only via the central cavity section 76 (see FIG. 8).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity;
    an arced rib in the internal core cavity, the arced rib extending from the first side to the second side and dividing the internal core cavity into a forward core cavity and an aft core cavity, the arced rib being arced such that a profile of the arced rib when taken in a radial cross-section is arced;
    a cooling passage network embedded in the airfoil wall aft of the arced rib and between inner and outer portions of the airfoil wall, the cooling passage network including a cooling passage leading edge and a cooling passage trailing edge, the aft core cavity having a central cavity section and a cavity lobe extending from the central cavity section and projecting between the arced rib and the cooling passage leading edge; wherein the cavity lobe has an arced cavity leading edge, the arced cavity leading edge being arced such that a profile of the arced cavity leading edge when taken in a radial cross-section is arced; and
    wherein the cavity lobe has a straight cavity trailing edge, the straight cavity trailing edge being straight such that a profile of the straight cavity trailing edge when taken in a radial cross-section is straight.

2. The airfoil as recited in claim 1, wherein the cavity lobe opens exclusively to the central cavity section.

3. The airfoil as recited in claim 1, wherein the airfoil includes a platform attached to the airfoil section, the platform includes an opening that opens into the central cavity section, and the opening includes a notch that opens to the cavity lobe.

4. The airfoil as recited in claim 1, wherein the airfoil includes a platform attached to the airfoil section, and the platform includes an opening that opens exclusively into the central cavity section.

5. The airfoil as recited in claim 1, wherein, in the airfoil section, the cooling passage network and the aft core cavity are fluidly isolated from each other.

6. The airfoil as recited in claim 1, wherein the cooling passage network includes a plurality of segmented longitudinally-elongated ribs.

7. The airfoil as recited in claim 6, wherein the segmented longitudinally-elongated ribs are parallel.

8. The airfoil as recited in claim 1, wherein the cooling passage leading edge and the cooling passage trailing edge are parallel.

9. The airfoil as recited in claim 8, wherein the cooling passage network includes a plurality of segmented longitudinally-elongated ribs, and the segmented longitudinally-elongated ribs are parallel.

10. The airfoil as recited in claim 9, wherein, in the airfoil section, the cooling passage network and the aft core cavity are fluidly isolated from each other.

11. The airfoil as recited in claim 1, wherein the arced rib has first and second arced rib ends at, respectively, the first and second ends of the airfoil section and an intermediate radially-extending section from the first arced rib end to the second arced rib end, and the intermediate radially-extending section bows toward the leading end of the airfoil section.

12. The airfoil as recite in claim 11, wherein the leading end of the airfoil section is arced with a leading end curvature, and the arced rib is arced with a rib curvature that follows the leading end curvature.

13. The airfoil as recited in claim 1, wherein a profile of the cavity lobe when taken in a radial cross-section is D-shaped.

14. An airfoil comprising:
    an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity;
    an arced rib in the internal core cavity, the arced rib extending from the first side to the second side and dividing the internal core cavity into a forward core cavity and an aft core cavity, the arced rib being arced such that a profile of the arced rib when taken in a radial cross-section is arced;
    a cooling passage network embedded in the airfoil wall aft of the arced rib and between inner and outer portions of the airfoil wall, the cooling passage network including a cooling passage leading edge and a cooling passage trailing edge, the aft core cavity having a central cavity section and a cavity lobe extending from the central cavity section and projecting between the arced rib and the cooling passage leading edge; and wherein the cavity lobe tapers radially along the cooling passage leading edge.

15. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity,
an arced rib in the internal core cavity, the arced rib extending from the first side to the second side and dividing the internal core cavity into a forward core cavity and an aft core cavity, the arced rib being arced such that a profile of the arced rib when taken in a radial cross-section is arced;
a cooling passage network embedded in the airfoil wall aft of the arced rib and between inner and outer portions of the airfoil wall, the cooling passage network including a cooling passage leading edge and a cooling passage trailing edge, the aft core cavity having a central cavity section and a cavity lobe extending from the central cavity section and projecting between the arced rib and the cooling passage leading edge; wherein the cavity lobe has an arced cavity leading edge, the arced cavity leading edge being arced such that a profile of the arced cavity leading edge when taken in a radial cross-section is arced; and
wherein the cavity lobe has a straight cavity trailing edge, the straight cavity trailing edge being straight such that a profile of the straight cavity trailing edge when taken in a radial cross-section is straight.

16. The gas turbine engine as recited in claim 15, wherein the airfoil includes a platform attached to the airfoil section, the platform includes an opening that opens into the central cavity section, and the opening includes a notch that opens to the cavity lobe.

17. The gas turbine engine as recited in claim 15, wherein the airfoil includes a platform attached to the airfoil section, and the platform includes an opening that opens exclusively into the central cavity section.

18. The gas turbine engine as recited in claim 15, wherein, in the airfoil section, the cooling passage network and the aft core cavity are fluidly isolated from each other.

* * * * *